United States Patent [19]
Auer

[11] Patent Number: 6,145,409
[45] Date of Patent: Nov. 14, 2000

[54] HYBRID GEARBOX

[75] Inventor: Ernst Auer, Munich, Germany

[73] Assignee: Neunkirchener Maschinen - und Achsenfabrik GmbH & Co. KG

[21] Appl. No.: 09/063,494

[22] Filed: Apr. 20, 1998

[30] Foreign Application Priority Data

Apr. 30, 1997 [DE] Germany ............................ 197 18 461

[51] Int. Cl.[7] ................................................ F16H 47/02
[52] U.S. Cl. ........................................ 74/730.1; 74/731.1
[58] Field of Search ................................. 74/720, 730.1, 74/731.1, 718; 475/72, 74, 80

[56] References Cited

U.S. PATENT DOCUMENTS

| | | | |
|---|---|---|---|
| 2,962,915 | 12/1960 | Wiggermann | 74/730.1 X |
| 3,131,580 | 5/1964 | Forster | 74/730.1 X |
| 3,597,998 | 8/1971 | Ebert | 475/72 X |
| 3,757,525 | 9/1973 | Rusch et al. | 74/730.1 X |
| 3,880,017 | 4/1975 | Miyao et al. | 60/487 X |
| 4,121,479 | 10/1978 | Schauer | 475/72 X |
| 4,613,024 | 9/1986 | Irikura et al. | 74/15.6 X |
| 4,658,662 | 4/1987 | Rundle | 74/15.6 X |
| 5,099,936 | 3/1992 | Irikura et al. | 180/53.1 |
| 5,193,416 | 3/1993 | Kanayama | 74/730.1 X |
| 5,329,828 | 7/1994 | Hurth | 74/730.1 X |
| 5,421,790 | 6/1995 | Lasoen | 475/78 |
| 5,542,307 | 8/1996 | Hasegawa et al. | 74/730.1 X |
| 5,766,107 | 6/1998 | Englisch | 74/730.1 X |
| 5,803,856 | 9/1998 | Iino et al. | 74/730.1 X |

FOREIGN PATENT DOCUMENTS 4-19225  1/1992  Japan.

*Primary Examiner*—Khoi Q. Ta
*Attorney, Agent, or Firm*—Stoel Rives LLP

[57] ABSTRACT

A hybrid gearbox for land vehicles and automotive machines is designed such that the starting up and maneuvering operations of the vehicles are powered by a hydromotor and their normal travel is powered by a direct coupling with an internal combustion engine. In its normal operation, the internal combustion engine drives a neutrally positioned axial piston pump as well as the driven shaft. When operated under load, the driven shaft is decoupled from the internal combustion engine, and the latter drives the variable axial piston pump which in turn delivers pressure to the hydromotor.

18 Claims, 1 Drawing Sheet

HYBRID GEARBOX

FIELD OF THE INVENTION

The present invention relates to a hybrid gearbox for all kinds of land vehicles. The new gearbox is particularly suited for vehicles which frequently change their travel direction, which frequently start up, which exhibit large tractive powers and/or low travel speeds and high final speeds at the same time.

BACKGROUND OF THE INVENTION

Vehicles of this type are in particular construction machines such as wheel loaders, V-dump cars (dumpers), motor graders or back hoe loaders (multi-purpose dredges).

In the field of forestry equipment, the hybrid gearbox is suitable for skidders, forwarders, harvesters and lumber transport vehicles for use in mountainous terrain.

In the field of municipal vehicles, the hybrid gearbox can be used for street sweepers, snow removers, rotary snow plows, lateral mowers for lane edges and side street maintenance vehicles.

The hybrid gearbox is moreover suitable for use in city buses which have their engine built in transversally to the vehicle, in a horizontal version and in connection with an axle without bevel differential gear.

SUMMARY OF THE INVENTION

It is the object of the present invention to provide an as simple as possible gearbox for a hybrid drive by means of which the land vehicle is driven either directly or hydraulically by an internal combustion engine, in particular a diesel engine.

This object is accomplished in that the hybrid gearbox is either directly mounted on the flywheel casing of the internal combustion engine or that it is driven via a shaft. By means of an automatic transmission, the internal combustion engine may be directly coupled to a driven shaft or a hydromotor which in turn receives pressure from an axial piston pump, said pump being likewise driven by the internal combustion engine. Further features may be gathered from the following description and the attached claims.

From the input shaft of the gearbox, the hydrostatic pump with variable swept volume is driven via an intermediate gear. By selecting this transmission ratio appropriately, a speed of the combustion engine which has been kept low so as to reduce noise and emissions can be increased to a higher value, thus allowing the use of smaller, lighter and cheaper pumps. Via a further intermediate gear, e.g. for bridging the axle distance required for all-wheel drive, a gearwheel is driven which is supported on the driven shaft of the gearbox. This gearwheel may be connected to the drive shaft by means of an axially movable coupling sleeve in such a way that it remains in rotation but also remains slidable.

Furthermore, a hydromotor is mounted on the gearbox and is in turn connected to a second, similarly supported gearwheel on the driven shaft. An intermediate gear may be provided in the form of a block gear for generating a larger transmission ratio between the hydromotor shaft and the driven shaft.

The direct connection of the drive shaft allows auxiliary drives to get a movement at the full engine power. Depending on the space available, the hydraulic pump and the hydromotor may either both be mounted on the drive or driven side of the gearbox, or, alternatively, one on each side.

Further details, features and advantages of the invention may be gathered from the following description of an embodiment which is schematically shown in the drawing.

DETAILED DESCRIPTION OF PREFERRED EMBODIMENT

Figure 1:
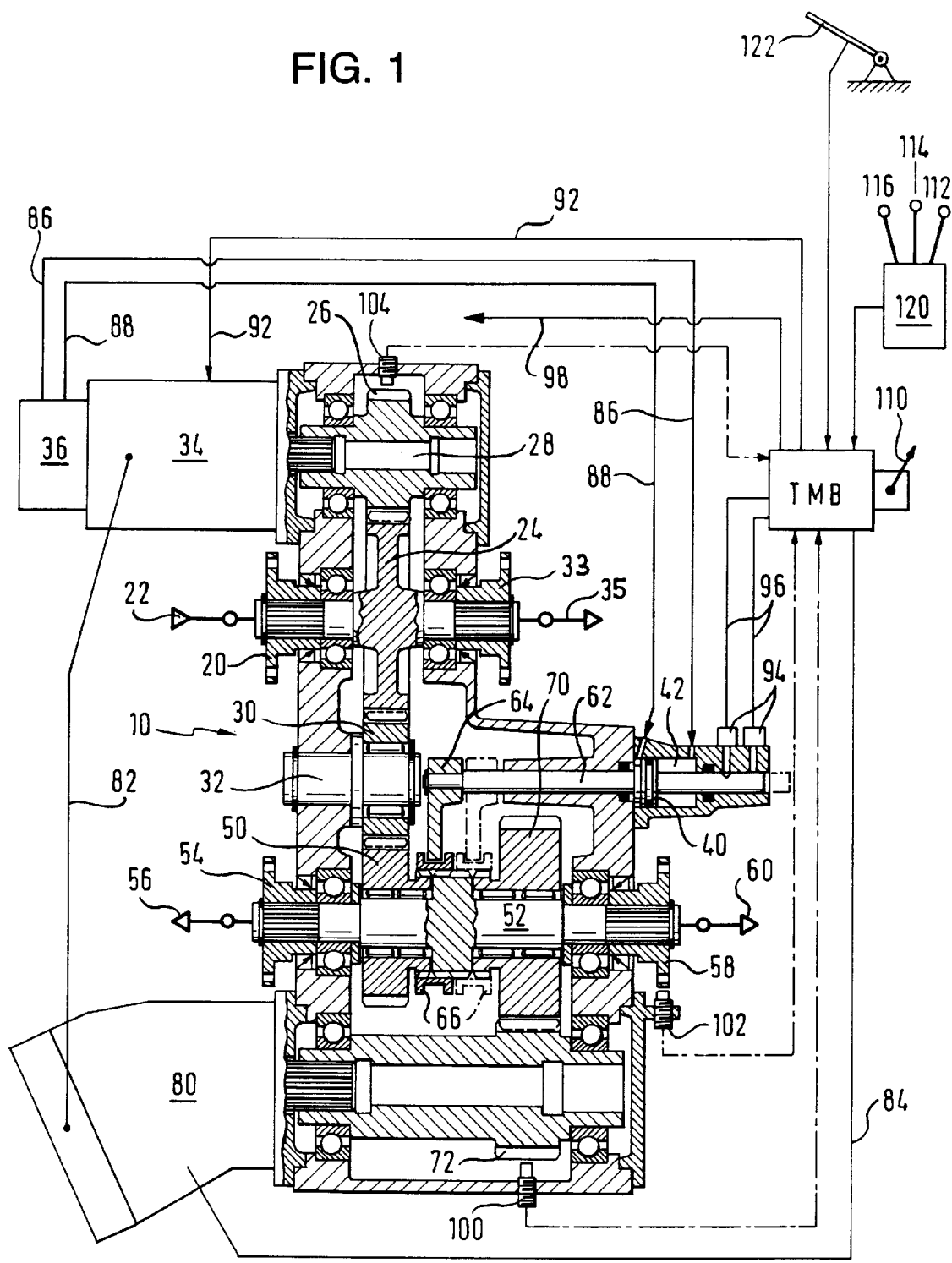
FIG. 1 is a part schematic and part cross sectional view of a preferred hybrid gearbox of the present invention.

An input shaft 20 is driven by an internal combustion engine (not shown) at 22, either directly or via an intermediate gear. A toothed gear 24 is connected to said drive shaft 20 in such a way that it remains in rotation said toothed gear 24 meshing on the one hand with a pinion 26 on a shaft 28 and on the other hand meshes with an intermediate gear 30 on a countershaft 32. In the present example, provided with the input shaft 20 is a connection 33 for a suggested power take-off shaft 35. In the case of multi-purpose vehicles or machines, this would serve for flanging an aggregate (35) thereto.

Shaft 28 drives a first pump 34 for generating a hydrostatic pressure as well as a second pump 36 for moving a control piston 40 in a cylinder 42.

In the view of FIG. 1, the intermediate gear 30 engages a gearwheel 50 which is mounted on a driven shaft 52 which latter is connected to the vehicle drive wheels. Consequently, shaft 52 as shown in the Figure may have a flange 54 on its left which transmits the driving moment to the front axle, as indicated by arrow 56, and may exhibit a flange 58 on its right which is connected to the rear axle, as indicated by arrow 60.

In the position marked in the drawing the control piston 40 is in its left end position in the cylinder 42. This also causes a piston rod 62 to be moved to its left position with a coupling finger 64 and a coupling claw 66. In this position, the coupling claw 66 has been moved to the position indicated by continuous lines, in which the gearwheel 50 meshes with the intermediate gear 30, thus causing the driving torque to be transmitted to the driving wheels at a ratio of almost 1:1 or geared down to a small ratio. In this position of the coupling claw 66, which is coupled to shaft 52, engages the gearwheel 50, and a further gearwheel 70 does not engage coupling claw 66, so gearwheel 70 can rotate on bearing 134 around shaft 52 in response to gear rim 72 on a shaft mounted below which may be driven by a hydromotor 80. This driving power from the hydromotor 80 will not be transmitted to the driven shaft 52 as long as the gearwheel 70 and coupling claw 66 do not mesh.

Only after the control piston 40 in cylinder 42 has been moved to the right-hand position and the coupling finger 62 has moved the coupling claw 66 into the position indicated by broken lines will the gearwheel 50 disengage the coupling claw 66 and rotate on bearing 132 in response to the intermediate gear 30, and the gearwheel 70 will mesh with the coupling claw 66. The driven shaft 52 will thus be driven by the hydromotor 80.

This known adjustability of axial piston machines, however, may also be made a feature of the hydromotor 80. For this purpose, a control line 84 is provided. The hydrostatic motor 80 is used for starting up. By selecting the appropriate setting for the piston in the cylinder 42, namely by admitting pressure from the second pump 36 to act upon the piston via a line 88, the coupling claw 66 is in its above-described right-hand position and the driven shaft 52 is coupled to the pinion 72 through gearwheel 70, while the gearwheel 50 runs free in this position. Only after switch-over to mechanical operation, as set out hereinafter, will the piston 40 be acted upon by pressure from a pressure line 86.

This known adjustability of axial piston machines, however, may also be made a feature of the hydromotor 80. For this purpose, a control line 84 is provided. The hydrostatic motor 80 is used for starting up. By selecting the appropriate setting for the piston in the cylinder 42, namely by admitting pressure from the second pump 3 to act upon the piston via a line 88, the coupling claw 66 is in its above-described right-hand position and the gearwheel 70 on the driven shaft 52 meshes with the pinion 72, while the gearwheel 50 runs free in this position. Only after switch-over to mechanical operation, as set out hereinafter, will the piston 40 be acted upon by pressure from a pressure line 86.

Swinging out the variable hydraulic pump 34 allows the drive to be engaged without any tear and wear, and the vehicle will accelerate up to a speed which is predetermined by the design of the hydrostatic drive. The direction in which the pump 34 is swung out also allows for determining the travel direction.

For switching over from a hydrostatic drive to a purely mechanical one, the hydrostatic drive is adjusted to be torque-free by suitable pump control via a transmission management box (TMB), and at the same time the diesel engine is accelerated to such a speed that the rotational speed of the mechanical gearwheel 50 is identical with the speed of the drive shaft as defined by the present travel speed. These speeds are measured by means of respective sensors 100, 102, 104, which transmit their respective signals to the TMB. The speed of the hydromotor 80 is determined by sensor 100, the speed of the driven shaft 52 is determined by sensor 102 and the reduced speed of the internal combustion engine is determined by sensor 104, and all data is delivered to the TMB via the dot-dash lines. The positions of the piston 40 and of the piston rod 62 are traced by the sensors 94 and transmitted to the TMB via lines 96. During automatic operation, the TMB automatically controls the control of the injection pump of the internal combustion engine via a line 98.

The shift point position, i.e. the position at which automatic switch-over from the starting up drive by means of the hydromotor 80 to the direct drive is desired, can be preselected via lever 110. The changeover from "automatic (112)" to "hydrostatic (114)" with the options of "forward"/"backward", or to "mechanical (116)" is effected at the switch box 120. The travel speed is at any rate controlled in the usual manner via pedal 122.

It is useful to switch between hydraulic and mechanical operation at the engine speed at which the torque of the internal combustion engine is highest. However, this switching time may also be set to any torque above the idling speed if the torque of the internal combustion engine is sufficient to further accelerate the vehicle.

This measure allows for all advantages of the hydrostatic travelling gear such as
  continuous control of the travel speed independent of the engine speed of the internal combustion engine,
  starting up and change of the travel direction without any tear and wear
  favourable efficiency as compared to hydrodynamic torque converters
to be exploited in the lower travel speed range.

The known worse efficiencies of the hydrostatic travelling gear at larger control ranges of the speed, due to small swinging angles of the hydromotors and large swept volumes of the pump and corresponding power losses, are avoided by the mechanical drive. Switch-over from hydrostatic to mechanical drive may either be directly effected by the driver or be controlled by an automatic transmission in the TMB, i.e. independently of the driver.

If a power shift element is additionally provided between the hybrid gearbox and the hydromotor (cf. DE 44 14 127, C1), a conversion range is obtained e.g. for a wheel loader which allows for travel speeds from 0–25 km/h to be obtained with small hydrostatic units with the high transverse forces for loosening the material, at the same time enabling a travel speed on public streets or roads of up to 50 or 62 km/h without causing essential costs.

As a side effect, in vehicles for which a retarder is mandatory by law, the hydrostatic pump can be used as a tear- and wear-free retarder for the mechanically operated speeds directing it against a pressure control valve. The heat generated is discharged to the environment via the radiator which is provided anyway.

This is to be demonstrated with the concrete example of a lumber transport vehicle.

| | |
|---|---|
| Dead weight | 13 t |
| Useful load | 12 t |
| Total weight | 25 t |
| Tires | 700–22.5 |
| Tire radius | 0.53 m |
| Tractive power | at least 15 t |
| Rolling resistance (firm street or road) | 0.03 |
| Mechanical efficiency | 85% |
| Drag coefficient $c_w$ | 1.0 |
| Cross-sectional area | 9.1 m$^2$ |
| Axle transmission ration | 13 |
| Diesel engine | 128 kw (175 HP) at 2,500 rpm |
| Maximum torque | 650 Nm at 1,200 rpm |
| Transmission ratio for mechanical drive | 0, 78 |
| Transmission ratio for hydrostatic drive | |
| 1st gear | 7.96 |
| 2nd gear | 2, 47 |
| Hydraulic pump, q max. | 71 cm$^3$/rev. |
| Transmission ratio between diesel and pump | 0.75 |
| Maximum pump speed | 3,300 rpm |
| Maximum pump swept volume | 235 1/min |
| Hydromotor, q max. | 160 cm$^3$ per revolution |
| Hydromotor, q min. | 55 cm$^3$ per revolution |

The following values are obtained based on the above main data:

| | |
|---|---|
| Maximum hydromotor speed | 4,000 rpm |
| Maximum hydromotor torque | 1,020 Nm at q max. and 420 bar |
| Maximum travel speed | |
| in the 1st hydrostatic gear | 7.85 km/h |
| in the 2nd hydrostatic gear | 25.3 km/h |
| Maximum tractive force | |
| in the 1st hydrostatic gear | 152,350 N |
| in the 2nd hydrostatic gear | 47,275 N |

-continued

| Maximum travel speed | |
|---|---|
| in the mechanical gear | 50.2 km/h |
| Maximum tractive force | |
| at maximum travel speed | 8,000 Nm |
| Maximum gradient which can be travelled at maximum torque of the diesel engine | approx. 4.7% at 25 km/h |

For switching with optimum exploitation of the acceleration, the hydrostatic drive is driven to its maximum speed in the 2nd hydrostatic gear, i.e. a hydromotor speed of 4,000 rpm which corresponds to a speed of about 1,620 rpm of the driven gear shaft. The speed of the diesel engine is stepped down or up until it likewise generates this speed of the idle wheel on the drive shaft, together with the mechanical transmission. Then a switch-over from the hydrostatic to the mechanical drive is effected.

It will be obvious to those having skill in the art that many changes may be made to the details of the above-described embodiment of this invention without departing from the underlying principles thereof. The scope of the present invention should, therefore, be determined only by the following claims.

What is claimed is:

1. A hybrid gearbox for a vehicle, comprising:
   an internal combustion engine;
   an input shaft for delivering driving torque from the internal combustion engine;
   a power take-off connection integral with the input shaft for driving an auxiliary device;
   an input gearwheel mounted on and in drivable engagement with the input shaft for distributing the driving torque to a drive coupled to a pump;
   a first gearwheel rotatably mounted around a driven shaft and in constant communication with the driving torque, the first gearwheel being rotatable around the driven shaft in response to the driving torque;
   a hydromotor that receives pressure from the pump for hydrostatic operation;
   a second gearwheel slidably mounted around the driven shaft and in constant communication with a piston on a hydromotor shaft of the hydromotor, the second gearwheel being rotatable around the driven shaft in response to rotation of the hydromotor shaft;
   a hydraulic piston rod and a first coupling member mounted thereon that move together in response to pressure from the pump; and
   a second coupling member coupled to the first coupling member and engaged with the driven shaft and engageable and disengageable with the first and second gearwheels in response to movement from the hydraulic piston rod, such that whenever the second coupling member is engaged with the driven shaft and the first gearwheel, the second coupling member is disengaged with the second gearwheel and the driving torque is coupled with the driven shaft to provide mechanical operation of the driven shaft, and such that whenever the second coupling member is engaged with the driven shaft and the second gearwheel, the second coupling member is disengaged with the first gearwheel so the driven shaft is uncoupled from the driving torque and the pump provides pressure to the hydromotor to provide hydrostatic operation of the driven shaft.

2. The hybrid gearbox as claimed in claim 1 wherein a transmission is effected between the input gearwheel on the input shaft and the drive of the pump.

3. The hybrid gearbox as claimed in claim 1 wherein the second coupling member has a neutral position wherein the driven shaft is uncoupled from both the first and second gearwheels and the power take-off connection receives driving torque from the input shaft.

4. The hybrid gearbox as claimed in claim 1 further comprising:
   sensors for detecting the relative speeds of the pinion, the driven shaft, and the drive coupled to the pump; and
   an adjustable switch box that receives signals from the sensors and automatically synchronizes a switch-over from hydrostatic to mechanical operation after suitable speeds have been determined by the sensors.

5. The hybrid gearbox as claimed in claim 1 wherein the driven shaft has a pair of flanges for transmitting torque from the driven shaft to a front axle and to a rear axle, respectively.

6. The hybrid gearbox as claimed in claim 1 wherein the pump runs free in a neutral position without generating any pressure to the hydromotor during mechanical operation.

7. The hybrid gearbox as claimed in claim 1 wherein the pump comprises an axial piston pump, wherein the hydraulic piston rod forms part of a hydraulic piston in a cylinder that is responsive to pressure from a hydraulic pump, which is responsive to the axial piston pump, and wherein positions of the cylinder are detectable by sensors.

8. The hybrid gearbox as claimed in claim 1 wherein a swing out direction of the axial piston pump determines a travel direction of the vehicle and a change in such travel direction does not create significant wear, and wherein mechanical operation permits efficient operation at high travel speeds.

9. A hybrid gearbox for a vehicle, comprising:
   an internal combustion engine;
   an input shaft for delivering driving torque from the internal combustion engine;
   an input gearwheel mounted on and in drivable engagement with the input shaft for distributing the driving torque to a drive coupled to an axial piston pump;
   a first gearwheel slidably mounted around a driven shaft and in constant communication with the driving torque, the first gearwheel being rotatable around the driven shaft in response to the driving torque;
   a hydromotor that receives pressure from the axial piston pump for hydrostatic operation;
   a second gearwheel slidably mounted around the driven shaft and in constant communication with a pinion on a hydromotor shaft of the hydromotor, the second gearwheel being rotatable around the driven shaft in response to rotation of the hydromotor shaft;
   a hydraulic piston rod and a first coupling member mounted thereon that move together in response to pressure from a second pump coupled to the axial piston pump; and
   a second coupling member coupled to the first coupling member and engaged with the driven shaft and engageable and disengageable with the first and second gearwheels in response to movement from the hydraulic piston rod, such that whenever the second coupling member is engaged with the driven shaft and the first gearwheel, the second coupling member is disengaged with the second gearwheel and the driving torque is coupled with the driven shaft to provide mechanical operation of the driven shaft, and such that whenever the second coupling member is engaged with the driven shaft and the second gearwheel, the second coupling member is disengaged with the first gearwheel so the driven shaft is uncoupled from the driving torque and the axial piston pump provides pressure to the hydromotor to provide hydrostatic operation of the driven shaft;

pinion, driven shaft, and axial piston pump drive sensors for detecting the relative speeds of the piston, the driven shaft, and the drive coupled to the axial piston pump; and an adjustable switch box that receives signals from the sensors and automatically synchronizes a switch-over from hydrostatic to mechanical operation.

10. The hybrid gearbox as claimed in claim 9 wherein the input shaft has a power take-off connection for a shaft-driven auxiliary device.

11. The hybrid gearbox as claimed in claim 9 wherein the driven shaft has a pair of flanges for transmitting torque from the driven shaft to a front axle and to a rear axle, respectively.

12. The hybrid gearbox as claimed in claim 9 wherein the second pump comprises a hydraulic pump driven by the axial piston pump, wherein the hydraulic piston rod forms part of a hydraulic piston in a cylinder that is responsive to pressure from the hydraulic pump, and wherein positions of the cylinder are detectable by cylinder sensors.

13. The hybrid gearbox as claimed in claim 9 wherein the axial piston pump runs free in a neutral position without generating any pressure to the hydromotor during mechanical operation.

14. A hybrid gearbox for a vehicle, comprising:

an internal combustion engine;

an input shaft for delivering driving torque from the internal combustion engine;

an input gearwheel mounted on and in drivable engagement with the input shaft for distributing the driving torque to a drive coupled to an axial piston pump;

a first gearwheel slidably mounted around a driven shaft and in constant communication with the driving torque the first gearwheel being rotatable around the driven shaft in response to the driving torque;

a hydromotor that receives pressure from the axial piston pump for hydrostatic operation;

a second gearwheel slidably mounted around the driven shaft and in constant communication with a pinion on a hydromotor shaft of the hydromotor, the second gearwheel being rotatable around the driven shaft in response to rotation of the hydromotor shaft;

a hydraulic piston rod and a first coupling member mounted thereon that move together in response to pressure from the axial piston pump; and a second coupling member coupled to the first coupling member and engaged with the driven shaft and engageable and disengageable with the first and second gearwheels in response to movement from the hydraulic piston rod, such that whenever the second coupling member is engaged with the driven shaft and the first gearwheel, the second coupling member is disengaged with the second gearwheel and the driving torque is coupled with the driven shaft to provide mechanical operation of the driven shaft, and such that whenever the second coupling member is engaged with the driven shaft and the second gearwheel, the second coupling member is disengaged with the first gearwheel so the driven shaft is uncoupled from the driving torque and the axial piston pump provides pressure to the hydromotor to provide hydrostatic operation of the driven shaft; and a pair of flanges mounted on the driven shaft for transmitting torque from the driven shaft to a front axle and to a rear axle, respectively.

15. The hybrid gearbox as claimed in claim 14 wherein the input shaft has a power take-off connection for a shaft-driven auxiliary device.

16. The hybrid gearbox as claimed in claim 14 wherein the axial piston pump runs free in a neutral position without generating any pressure to the hydromotor during mechanical operation.

17. The hybrid gearbox as claimed in claim 9 wherein a swing out direction of the axial piston pump determines a travel direction of the vehicle and a change in such travel direction does not create significant wear, and wherein mechanical operation permits efficient operation at high travel speeds.

18. The hybrid gearbox as claimed in claim 9 further comprising:

a hydraulic pump driven by the axial piston pump wherein the hydraulic piston rod forms part of a hydraulic piston in a cylinder that is responsive to pressure from the hydraulic pump and wherein positions of the cylinder are detectable by sensors.

* * * * *